(12) United States Patent
Baentsch et al.

(10) Patent No.: US 8,938,784 B2
(45) Date of Patent: Jan. 20, 2015

(54) AUTHORIZATION OF SERVER OPERATIONS

(71) Applicant: International Business Machines Corporation, Armonk, NY (US)

(72) Inventors: Michael Baentsch, Rueschlikon (CH);
Peter Buhler, Rueschlikon (CH);
Thomas Eirich, Rueschlikon (CH);
Reto J. Hermann, Rueschlikon (CH);
Frank Hoering, Rueschlikon (CH);
Thorsten Kramp, Rueschlikon (CH);
Michael P. Kuyper-Hammond, Rueschlikon (CH); Thomas D. Weigold, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/109,468

(22) Filed: Dec. 17, 2013

(65) Prior Publication Data

US 2014/0109212 A1     Apr. 17, 2014

Related U.S. Application Data

(62) Division of application No. 13/063,969, filed as application No. PCT/IB2009/054074 on Sep. 17, 2009, now Pat. No. 8,640,255.

(30) Foreign Application Priority Data

Sep. 17, 2008    (EP) ..................................... 08105363

(51) Int. Cl.
*H04L 12/22*        (2006.01)
*H04L 29/06*        (2006.01)
(Continued)

(52) U.S. Cl.
CPC ............ *H04L 63/0823* (2013.01); *G06F 21/34* (2013.01); *G06F 21/33* (2013.01)
USPC ........................ 726/4; 726/5; 726/17; 726/27

(58) Field of Classification Search
None
See application file for complete search history.

(56) References Cited

U.S. PATENT DOCUMENTS

| 6,895,502 B1 | 5/2005 | Fraser |
| 2007/0011066 A1 | 1/2007 | Steeves |

(Continued)

FOREIGN PATENT DOCUMENTS

| JP | 10320458 A | 12/1998 |
| JP | 2003527714 A | 9/2003 |
| JP | 2007316959 A | 12/2007 |

OTHER PUBLICATIONS

International Search Report; International Application No. PCT/IB2009/054074; International Filing Date: Sep. 17, 2009; Date of Mailing: Dec. 7, 2009, pp. 1-3.

(Continued)

*Primary Examiner* — Venkat Perungavoor
(74) *Attorney, Agent, or Firm* — Cantor Colburn LLP

(57) ABSTRACT

An authorization device for authorizing operations of a remote server requested from user computers via a data communications network includes a computer interface configured to connect to a local user computer for facilitating communication with the remote server via a data communications network, a user interface configured to present information to a user, and control logic. The control logic is adapted to use security data accessible to the control logic to establish, via the local user computer, a mutually-authenticated connection for encrypted end-to-end communications with the server; collect from the server, via the connection, information indicative of any operation requested via a different connection to the server and requiring authorization by the user; and present the information to the user via the user interface to prompt for authorization of the operation.

6 Claims, 4 Drawing Sheets

(51) Int. Cl.
*G06F 21/34* (2013.01)
*G06F 21/33* (2013.01)
*H04L 12/12* (2006.01)

(56) References Cited

U.S. PATENT DOCUMENTS

2007/0033136 A1 2/2007 Hu
2009/0132808 A1 5/2009 Baentsch et al.

OTHER PUBLICATIONS

Gunter Karjoth, "Access Control with IBM Tivoli Access Manager," ACM Transactions on INformation and System Security, vol. 6, No. 2, May 2003, pp. 232-257.

Karjoth, Günter, "The Authorization Service of Tivoli Policy Director", In Proceedings of the 17th Annual Security Applications Conference, Dec. 2001, pp. 1-10.

Neuman, B., "Proxy-Based Authorization and Accounting for Distributed Systems", 1993 IEEE, pp. 283-291.

Thomas Weigold, et al, "Remote Client Authentication," IEEE Computer Society, IEEE Security and Privacy, 2008, pp. 36-43.

Thomas Weigold, et al., "The Zurich Trusted Information Channel: An efficient defence against man-in-the-middle and malicious software attacks," Trust 2008, LNCS 4968, Springer-Verlag, 2008, pp. 75-91.

International Search Report—Written Opinion; International Application No. PCT/IB2009/054074; International Filing Date: Sep. 17, 2009; Date of Mailing: Dec. 7, 2009, pp. 1-7.

APPC/MVS Distributed Application Support; F.W. Voss; IBM Systems Journal, vol. 31, No. 2; 1992; pp. 381-408.

AUTHORIZATION OF SERVER OPERATIONS

CROSS-REFERENCE TO RELATED APPLICATIONS

This application is a divisional of U.S. patent application Ser. No. 13/063,969, filed Mar. 15, 2011, which is a U.S. national stage of application No. PCT/IB2009/054074, filed on 17 Sep. 2009. Priority under 35 U.S.C. §119(a) and 35 U.S.C. §365(b) is claimed from European Patent Application No. 08105363.9, filed 17 Sep. 2008, and all the benefits accruing therefrom under 35 U.S.C. §119, the contents of which in its entirety are herein incorporated by reference.

BACKGROUND

This invention relates generally to authorization of server operations requested from user computers over data communications networks. Apparatus, systems and computer programs are provided for authorizing remote server operations and for controlling performance of operations by servers in dependence on such authorization.

There are numerous scenarios in which computer users communicate with a remote server via a data communications network to request performance of some operation by the server. Such a server is typically operated by the provider of a service for online access by remote users. The term "server" is used herein in the most general sense however, and includes any computer or system providing some service or functionality to connecting users. An operation performed by a server at a user's request might simply be granting the user access to some resource, for instance a database or restricted web site, or might be implementation of some transaction, such as a banking transaction, instructed by the user. In any case, the nature of the communications infrastructure is such that security is often a key concern, in particular ensuring that server operations are only performed for genuinely authorized users. In the case of electronic business carried out over the Internet, for example, online fraud is a constantly growing threat. Advanced attacks such as the infamous man-in-the-middle (MITM), and various types of malicious software such as viruses or Trojan horses, are increasing in prevalence, while countermeasures such as anti-virus software and firewalls always seem to be one step behind the attackers. Consequently user computers such as personal computers (PCs), as well as the Internet itself, must be considered inherently untrustworthy, presenting significant security risks for electronic transactions. By way of example, if a user connects from his PC to a portal of an online service provider to initiate a transaction, he cannot be sure that the transaction is not silently manipulated by some malicious software or MITM. A similar difficulty faces the service provider in that he cannot be sure that he is communicating with a genuine authorized user.

Various systems have been proposed to address some of the security issues in the above scenarios. For example, U.S. Pat. No. 6,895,502 discloses a security device which can be connected to a user PC and incorporates a reader for a smart card. When the user requests a resource from a remote server via his PC, the server responds by retrieving the user's public key and transmitting back an encrypted data blob including transaction information along with a challenge. The resource requested from the user PC is displayed on the security device, and the user can confirm whether he did or did not request this resource by input to the security device which is sent back to the server. This device allows the user of a given PC to give contemporaneous confirmation of resource requests issued one at a time from that PC. However, the system is vulnerable to "false-challenge" attacks. That is, any malicious party could generate an encrypted challenge under the user's public key and send it to the user PC, for example to confuse the user into replying. Moreover anyone can decrypt the user's reply message to a challenge with the user's public key. This system is therefore of limited usefulness and raises security and privacy issues of its own.

Our copending European Patent Application No. 07022419.1, filed on Nov. 19, 2007, discloses another device for connection to a user computer. This device is also described in "The Zurich Trusted Information Channel—An Efficient Defence against Man-in-the-Middle and Malicious Software Attacks", Thomas Weigold et al., in P. Lipp, A.-R. Sadeghi, and K.-M. Koch (Eds.): TRUST 2008, LNCS 4968, pp. 75-91, Springer-Verlag Berlin Heidelberg 2008. This device sets up a secure, mutually-authenticated end-to-end connection with the server when prompted by a proxy application on the user PC which is contacted by the browser to connect to a specific bank URL (universal resource locator). The ensuing browser session is then conducted via the secure connection and monitored by the security device. If the device detects security-sensitive information such as bank transaction details, these are displayed on the device and the user can press a button to indicate his confirmation. Only if the security device receives this confirmation will it maintain the connection and forward the transaction request to the server. This device again allows the user of a given PC to give contemporaneous confirmation of requests issued one at a time from that PC, though in this case the entire server session is conducted via the secure connection under control of the security device which determines when user authorization is required.

SUMMARY

One aspect of the present invention provides an authorization device for authorizing operations of a remote server requested from a local user computer via a data communications network. The authorization device includes a computer interface configured to connect to the local user computer for facilitating communication with the remote server via a data communications network; a user interface configured to present information to a user; and control logic adapted to: use security data to establish, via the local user computer, a mutually authenticated connection for encrypted end-to-end communications with the server; collect from the server, via the connection, information indicative of any operation requested via a different connection to the server and requiring authorization by the user; and present the information to the user via the user interface to prompt for authorization of the operation.

Thus, an authorization device embodying the present invention can be connected to a user computer via its computer interface and establishes a secure, mutually authenticated end-to-end connection with the server. In addition, the device control logic collects from the server over this connection information indicative of any operation requested via a different connection to the server which requires authorization by a user of the device. Thus, the acquisition of information on operation requests requiring authorization by the user is initiated by action of the control logic, and the operation requests about which information is received are those submitted over one or more different connections to the server. The device can thus collect details of any number of operation requests submitted to the server at any time, whether before or after setup of the secure connection, and submitted by any user from any user computer, whether that to which the device is currently connected and/or one or more other computers having at some time established a network connection to the server. In this manner, authorization devices embodying the present invention provide the basis for secure authorization of server operations requested from untrusted user computers in a mobile computing environment, as well as for multi-party authorization of requests in such environments. In particular, server operations can be dependent on authorization by more than one authorizing user, the necessary authorizations being obtained asynchronously as different users connect to the server via authorization devices and collect details of outstanding operation requests. Moreover, any other session, e.g. a current browser session, between the user computer and the server can remain unaffected by the authorization procedure on the secure connection and can be conducted entirely as normal. Devices embodying the invention thus offer flexible, efficient and user-friendly systems for secure multi-party authorization of server operations over insecure systems in a mobile computing environment.

To collect the operation request information from the server the device control logic will issue some form of request to the server to prompt return of the information, though in general this request may be explicit or implicit. For example, the request could be implicit in the process of establishing the secure connection, the server responding to successful establishment of the connection by sending any operation request information appropriate to an authorizing user associated with the security data used to establish the connection. Alternatively, the control logic might send an explicit request for information about operation requests requiring authorization by the device user. Thus, the control logic may be adapted to send the request for information via the secure connection, for example in response to establishment of the connection, and preferably requests the information from the server periodically while the secure connection persists. The key point here is that acquisition of operation request information from the server is initiated by the authorization device, allowing the device to obtain the information whenever and wherever it has a secure connection to the server in a mobile environment.

The control logic preferably initiates establishment of the secure connection to the server in response to connection of the authorization device to the local user computer. This process may or may not require some user input where the user interface includes an input mechanism, e.g. for keying in a user PIN (personal identification number). In any case, setup of the secure connection is reliant on the control logic having access to some form of security data which can be used for the mutual-authentication process. The security data typically comprises a secret key supplied by the service provider running the server, but in general could comprise any data such as one-time passwords or other mutually-known secrets for challenge response protocols allowing mutual-authentication of the authorization device and server for establishing the secure connection. The security data could be stored in memory of the authorization device, for example in a tamper-resistant chip embedded in the device. Alternatively, the security data could be stored in a separate security device with which the authorization device can interface to provide control logic access to the security data. A preferred form factor for the security device here is a smart card.

The authorization device itself may take a variety of forms. For example, where the device is adapted to interface with a security device such as a smart card carried by authorizing users, then the device is conveniently a small, transportable desktop device incorporating the card reader or other security device interface. Such a device could be dedicated solely to the authorization purpose or may be integrated with some other device providing additional functionality, for instance a mouse. Where the security data is stored in the authorization device itself, the device is ideally a small portable device which can easily be carried by a user, again dedicated solely to purpose or having combined functionality. As examples here, the device could be embodied in a memory stick or personal music player such as an MP3 player. In any case, to avoid the need to incorporate protection mechanisms to prevent interference by malicious software, the device preferably does not incorporate general-purpose computing functionality. That is, the device is preferably configured such that arbitrary code cannot be loaded to the device processor.

The user interface ideally comprises a display for displaying the operation request information, with or without intervening processing in the authorization device, to the user. However, alternatives can be envisaged as discussed below. In preferred embodiments, the user interface also includes an input mechanism for input of user authorization to the device, the control logic being adapted to convey the user authorization to the server via the mutually authenticated connection. Again, however, alternatives can be envisaged as described below. Where the user interface includes an input mechanism, this ideally allows for input of some user security information, e.g. a user PIN, to allow an authorized user to "unlock" the device for the authorization procedure.

A second aspect of the invention provides apparatus for controlling operations of a server requested from user computers via a data communications network. The apparatus comprises memory for storing rule data defining operations requiring authorization by one or more authorizing users, and control logic adapted:

in response to a request from a user computer to perform a the operation, to determine from the rule data whether authorization by at least one authorizing user is required for that operation and, if so, to defer that operation;

to communicate with an authorizing device according to the first aspect of the invention to establish the mutually authenticated connection;

to supply to the authorizing device via the connection information indicative of any deferred operations requested from user computers and requiring authorization by a user of the authorizing device, and to receive authorization from the user; and to initiate performance of a deferred operation in response to receipt of authorization from every authorizing user from whom authorization is required for that operation.

In embodiments of this aspect of the invention, the control logic can send the authorization request information in response to a request from the authorizing device via the mutually authenticated connection. Such a request might be explicit or implicit as discussed earlier, and might be treated by the apparatus as a standing request, whereby any further operation requests received during a predetermined time interval, and requiring authorization by the device user, will be sent to the authorization device via the secure connection.

A third aspect of the invention provides a server for performing operations requested from user computers via a data communications network. The server comprises: communications circuitry for communicating with user computers via the data communications network; server logic for performing the operations in response to requests from user computers; and apparatus according to the second aspect of the invention for controlling performance of the operations by the server logic.

A fourth aspect of the invention provides a data communications system comprising: a server according to the third aspect of the invention; at least one user computer for communicating with the server via a data communications network; and at least one authorization device according to the first aspect of the invention for connection to the user computer via the computer interface of the device; wherein the user computer is adapted to relay communications between the authorization device and server via the mutually authenticated connection.

A fifth aspect of the invention provides a computer program comprising program code means for causing a processor of an authorization device, adapted for connection to a user computer for communication with a remote server via a data communications network and having a user interface for presenting information to a user of the device, to:

use security data associated with the authorization device to establish via the local user computer a mutually authenticated connection for encrypted end-to-end communications with the server;

collect from the server via the connection information indicative of any operation requested via a different connection to the server and requiring authorization by a user of the device; and present the information to a user via the user interface to prompt for authorization of the operation.

A sixth aspect of the invention provides a computer program comprising program code means for causing a server, adapted for performing operations requested from user computers via a data communications network and having memory for storing rule data defining operations requiring authorization by one or more authorizing users, to:

determine from the rule data, in response to a request from a user computer to perform a the operation, whether authorization by at least one authorizing user is required for that operation and, if so, to defer that operation;

communicate with an authorizing device according to the first aspect of the invention to establish the mutually authenticated connection;

to supply to the authorizing device via the connection information indicative of any deferred operation requiring authorization by a user of the authorizing device, and to receive authorization from the user; and to perform a deferred operation in response to receipt of authorization from every authorizing user from whom authorization is required for that operation.

A computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention.

BRIEF DESCRIPTION OF THE SEVERAL VIEWS OF THE DRAWINGS

Exemplary embodiments of the invention will now be described, by way of example, with reference to the accompanying drawings in which.

DETAILED DESCRIPTION

Figure 1:
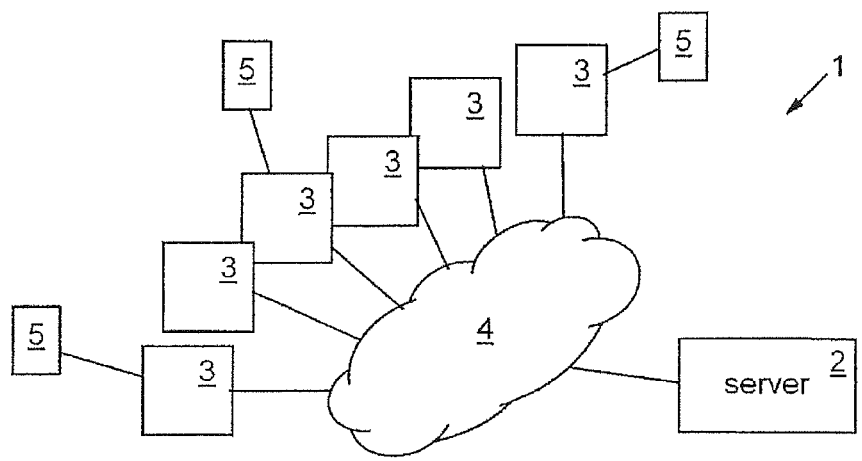
FIG. 1 is a schematic representation of a data communication system in accordance with an embodiment of the invention.

FIG. 1 shows a data communications system embodying the invention for implementing a secure, multi-party transaction authorization system in a mobile computing scenario. The system 1 includes a server 2 which can communicate with multiple user computers 3 via one or more data communications networks represented generally in the figure by network 4. We assume here that server 2 is implemented by a general-purpose computer configured to perform the functions described, though in general the functionality of server 2 could be distributed over a plurality of physical machines of a server system. User computers 3 might be implemented by a variety of computing devices, such as PCs, PDAs (personal digital assistants), mobile phones, etc., which are capable of data communications with server 2 via network 4. For the purposes of this example, it is assumed that server 1 gives access to an on-line banking service to which users operating computers 3 can periodically connect to perform banking transactions. The implementation of transactions by server 2 is subject to a multi-party authorization process. In particular, at least some transactions which might be requested from user computers 3 must be authorized by one or more authorizing users before they will be implemented by server 2. To authorize transactions, an authorizing user uses a dedicated mobile transaction authorization device (TAD) 5 which can be connected to a user computer 3, three such devices being indicated in FIG. 1.

Figure 2:
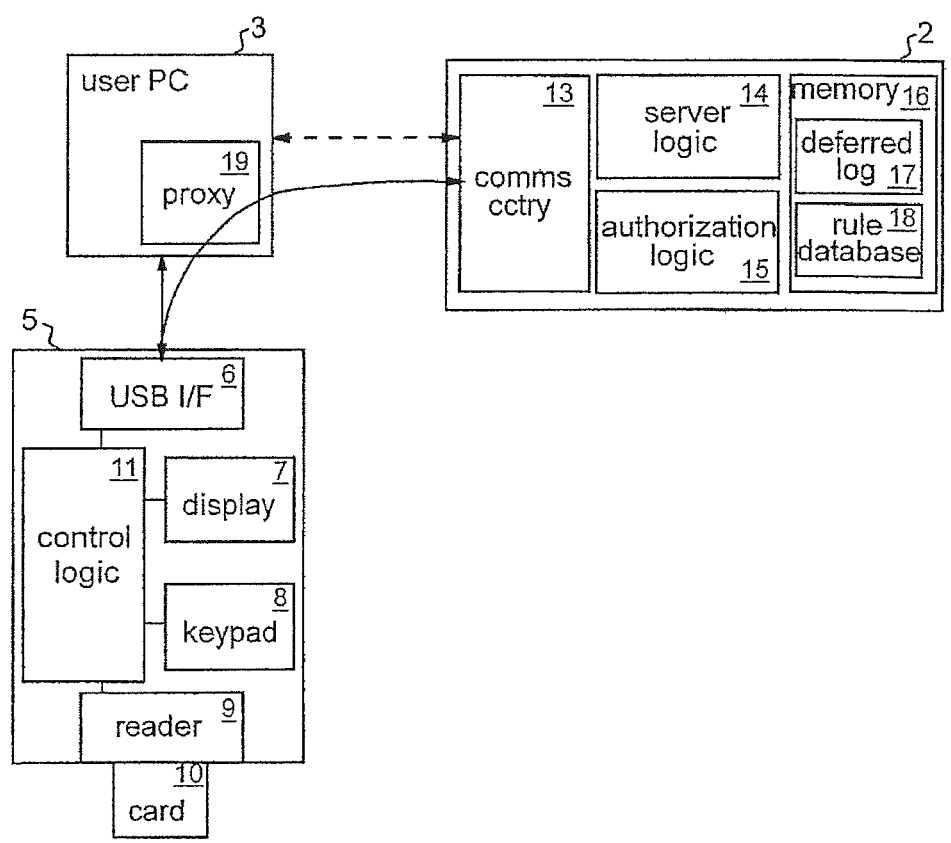
FIG. 2 illustrates in more detail an authentication device, user PC and server of the FIG. 1 system.

FIG. 2 is schematic block diagram of a TAD 5, user PC 3 and server 2 showing the main elements involved in the authorization system. The TAD 5 of this example is a small desktop device having a computer interface, here a USB interface 6, for connecting the device to user computer 3, and a user interface comprising a display 7 and a keypad 8 for user input. TAD 5 also has a security device interface in the form of card reader 9 for interfacing with a smart card 10. Control logic 11 controls operation of the device generally and implements the various steps of the authorization process described below. The server 2 includes the usual communications circuitry 13 for interfacing with data communications network(s) 4, and server logic 14 for performing the various functions of the on-line banking service. In addition, server 2 includes authorization apparatus comprising authorization control logic 15 and memory 16 containing various data used by the authorization logic 15 in operation. This includes a deferred transaction log 17, the purpose of which is described below, and a rule database 18. Rule database 18 defines the transactions which require authorization by one or more authorizing users. In particular, the rule data stored in database 18 indicates the transactions and, for each transaction, the identity of each of the authorizing users whose authorization is required for that transaction. The rule structure in database 18 may range from a simple rule-set to a complex data structure depending on the particular application. In general, the control logic 11 in TAD 5 and logic 14, 15 in server 2 could be implemented in hardware, software or a combination thereof though we assume here that this logic is implemented by software running on server computer 2 or a processor of TAD 5 as appropriate. Suitable software will be apparent to those skilled in the art from the description herein. The processor implementing control logic 11 of TAD 5 is designed such that additional, arbitrary code cannot be loaded to this processor.

Server 2 is shown having a first connection to user pc 3, indicated by the broken line in the figure, via network 4. For example, user PC will typically have an Internet connection to server 2 via by a web browser running on pc 3. User PC 3 is also shown as running a proxy application 19 which serves the TAD 5 as discussed further below. While in general proxy 19 could be pre-installed on the PC 3, in this preferred embodiment the proxy can be loaded from the TAD, for instance by means of the TAD registering itself as a USB mass storage device.

Smart card 10 is issued to an authorizing user by the bank running server 2. The card 10 contains security data for use in the authentication process to be conducted between the TAD 5 and server 2. In this example the security data is a secret cryptographic key, but the smart card is conveniently also personalized with user account information and certificates, e.g., service provider URL, trusted TLS/SSL (Transport Layer Security/ Secure Sockets Layer) certificates, user name, PIN, etc., and possibly additional cryptographic keys for use in communications with server 2.

Figure 3:
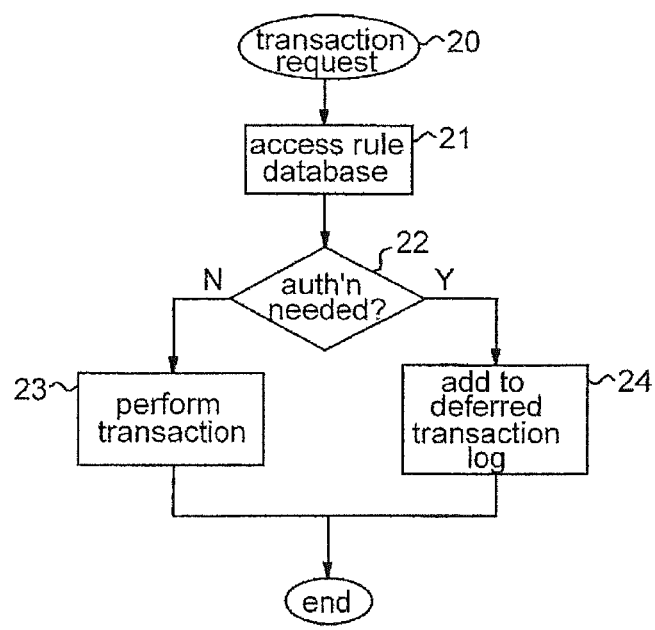
FIG. 3 indicates steps performed by the server on receipt of an operation request from a user PC.

In operation of system 1, bank customers can connect to server 2 from any (untrusted) computer 3 to log into the online banking portal and request the server to perform operations such as funds transfers or other banking transactions. Operation of the server 2 in response to such a transaction request is indicated in the flow chart of FIG. 3. This process is triggered by receipt of the transaction request as indicated at step 20. All transaction requests received by server 2 are passed by server logic 14 to authorization logic 15. In step 21 the authorization logic accesses the rule database 18 to check whether authorization is required for that transaction. If not, as indicated by a "No" (N) at decision step 22, the transaction request is returned to server logic 14 which simply performs the instructed transaction in step 23, and the process is complete. However, if authorization is required for the transaction as indicated by a "Yes" (Y) at decision step 22, then in step 24 authorization logic 15 makes an entry in the deferred transaction log 17. This entry records the transaction details as well as the identity of every authorizing user whose authorization is required for the transaction. The transaction is thus deferred pending receipt of the required authorization(s), and the process terminates.

Multiple users can instruct transactions at various times from different, untrusted user computers 3. All transaction requests are handled by server 2 as just described, whereby at any time the deferred transaction log might contain details of multiple transactions awaiting authorization. Each authorizing user identified in rule database 18 carries a smart card 10 as described above. Authorizing users can also carry a TAD 5 and/or TADs 5 may be provided for use with computers 3 at some locations. In any case, when an authorizing user with a TAD 5 has access to a network-connected computer 3, he can perform an authorization procedure as follows. The user inserts smart card 10 into TAD 5 and connects the TAD to user PC 3 via USB interface 6. The subsequent operation of TAD 5 is controlled by control logic 11 and indicated in the flow chart of FIG. 4. In response to connection of the TAD 5 to PC 3 as represented by step 30, the control logic 11 initiates the process of connecting to server 2. First, in step 31 the control logic prompts the user by message on display 7 to enter his PIN on keypad 8, and the number entered is checked against that stored in smart card 10. The device may give the user a number of opportunities to enter the correct PIN, but if no valid PIN is entered (N at decision 32) the process will terminate. Assuming, however, that the PIN is valid (Y at decision 32), then in step 33 the control logic launches the proxy application 19 on PC 3. Next as indicated in step 34, the control logic establishes, with the help of proxy 19, a mutually-authenticated connection for encrypted end-to-end communications between the TAD 5 and server 2. This connection is indicated by the solid line in FIG. 2. To establish this connection, the control logic communicates with the smart card 10 via card reader 9 to access the security data stored on the card 10. The pre-agreed secret key is used for encryption/ decryption of messages enabling mutual authentication of the TAD and server, and a TLS/SSL connection is established with server 2 by implementing the protocol setup in known manner. The TLS/SSL connection is end-to-end between the TAD 5 and the trusted server 2 of the service provider the TAD is configured for (via the secure data on smart card 10), whereas the proxy blindly relays network packets between the two. Consequently, the proxy 19 as well as PC 3 can be untrustworthy as all data passing through them is encrypted.

Figure 4:
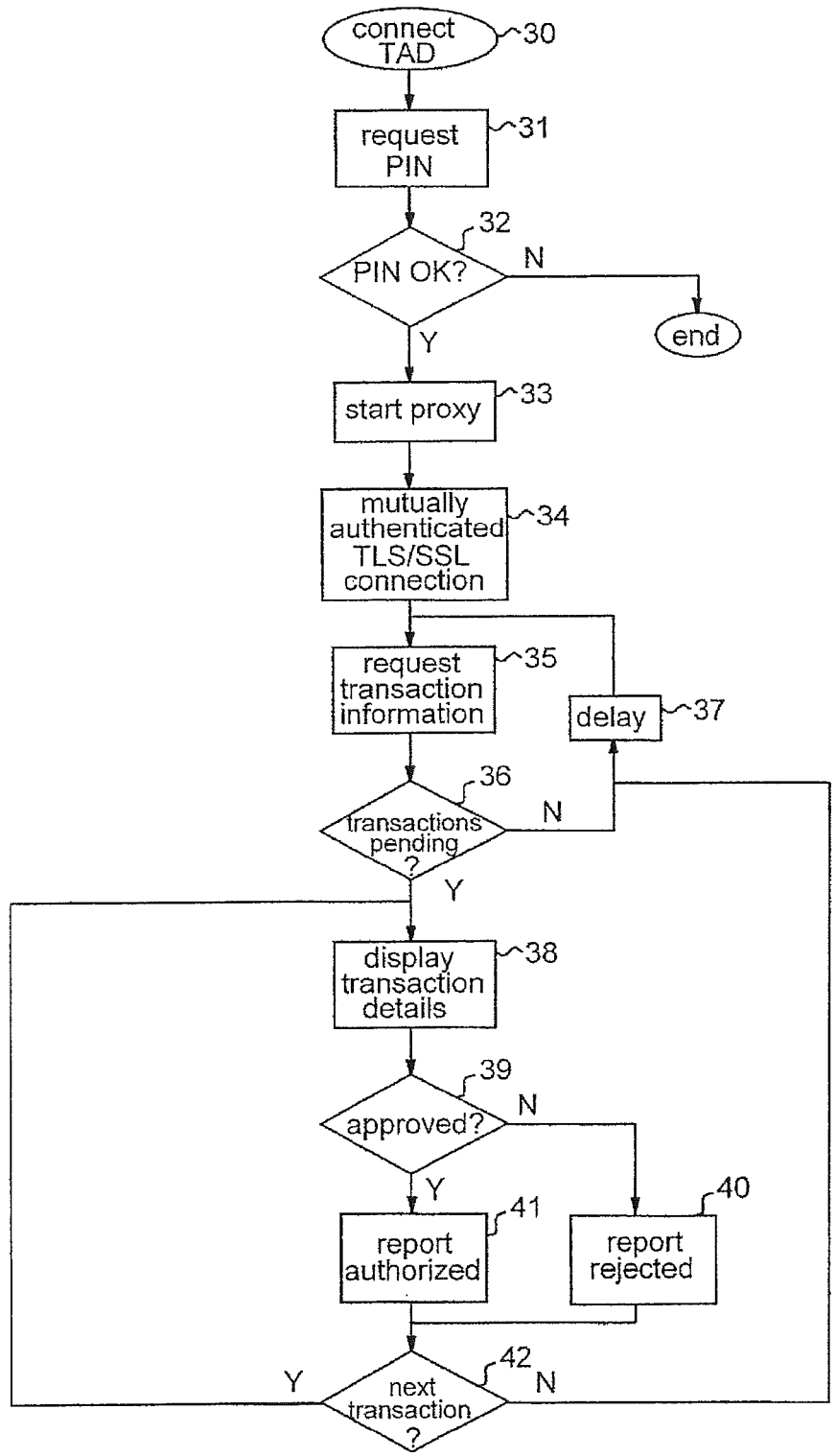
FIG. 4 indicates key steps in operation of the authentication device of FIG. 2.

After establishing the secure connection, in step 35 of FIG. 4 the control logic 11 sends a request to server 2 for information on any transactions which have been deferred pending authorization by the TAD's user. This request may include user ID data retrieved from card 10 if not already supplied in setting up the secure connection. If the server replies that there are no relevant transactions pending (N at decision step 36), the control logic waits a predetermined time interval represented by delay block 37. The process then reverts to step 35, whereby the request for transaction information will be periodically repeated while the secure connection persists. Returning to decision step 36, if transaction details are returned by server 2, then in step 38 the control logic displays details of the first transaction to be authorized on display 7. The display also prompts the user to approve or reject the transaction by input to keypad 8. The result is detected in decision step 39 and the user's rejection (step 40) or authorization (step 41) of the transaction is conveyed back to server 2 via the secure connection. In decision step 42 the control logic 11 decides if there is another transaction to display, and, if so, operation returns to step 38 for the next transaction. If not, operation reverts to delay step 37 awaiting the next request for transaction information.

The foregoing process continues while the TAD remains connected via its secure connection to server 2. In this way, the TAD 5 collects via the secure connection details of deferred transactions requiring authorization by the TAD's user and requested by any users via any of the other connections between user computers 3 and server 2, whether requested before or after connection of TAD 5. The deferred transactions can include transactions requested by the current TAD user via a browser session with server 2, this browser session being conducted entirely as normal and remaining unaffected by the presence of the TAD. Transactions can thus be authorized by the user whenever, and from wherever, he connects to the server, the transaction details being securely conveyed and securely authorized via the intermediary of untrusted computers 3 and untrusted network 4.

Figure 5:
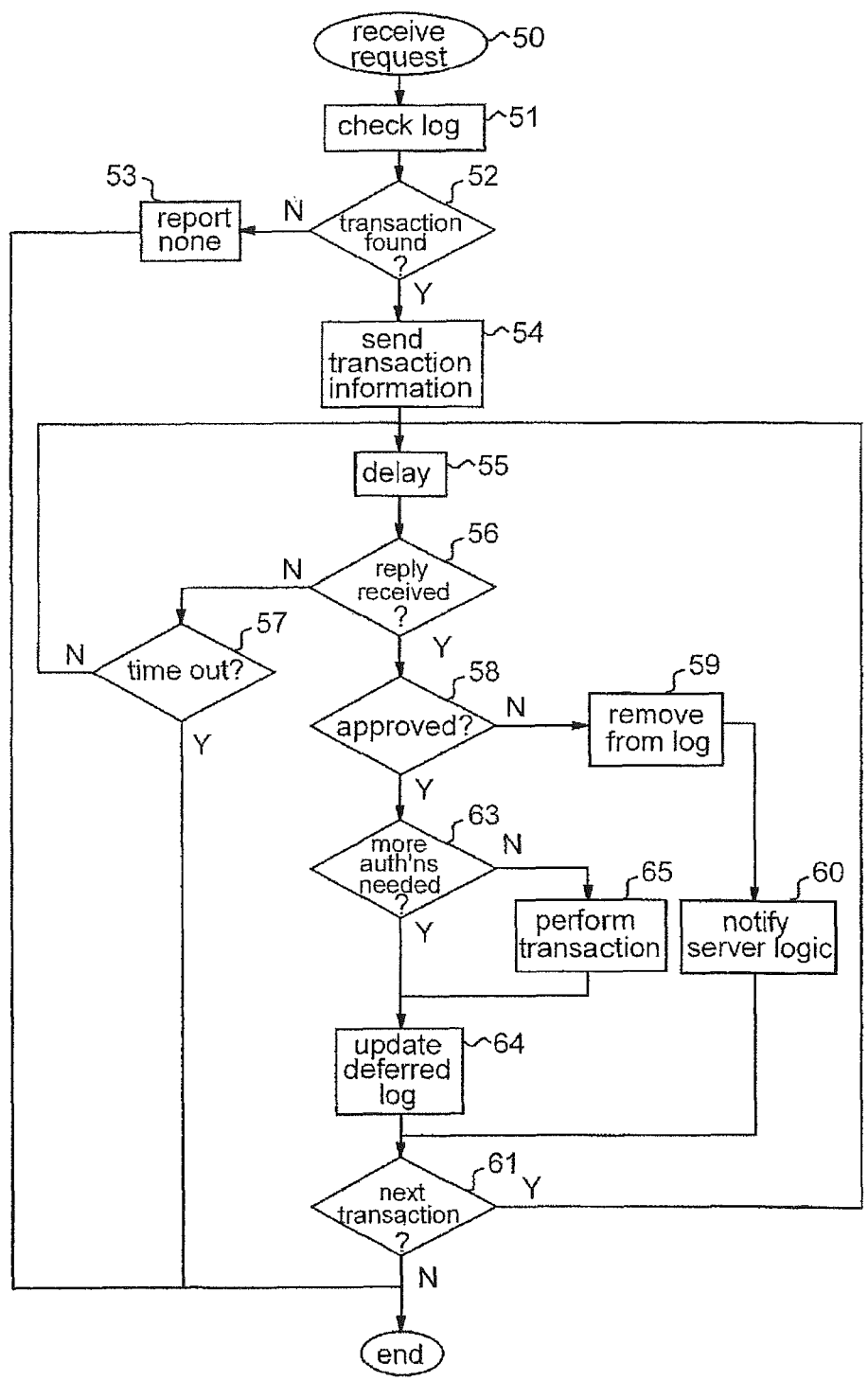
FIG. 5 indicates operation of the server on receipt of a request for transaction information from the authentication device of FIG. 2.

The operation of server 2 in response to a request for deferred transaction information from a TAD 5 is indicated in FIG. 5. All such requests are passed to authorization logic 15 of server 2. Step 50 represents receipt of a request by the authorization logic 15 which then checks the deferred transaction log in step 51 for any transactions requiring authorization by the requesting TAD's user. If no relevant transactions are found (N at decision 52) then this is reported back to the TAD in step 53 and the process terminates. If any relevant transactions are found in the log (Y at decision 52) then the transaction details are sent via the secure connection to the TAD, and the logic 15 then awaits authorization as indicated by delay 55. If no authorization response is received (N at decision 56) the logic 15 determines at step 57 if a "time-out" limit for the response has been reached and, if so, the process terminates. If not, operation reverts to delay 55 to wait a further time interval. When an authorization reply is received (Y at decision 56) the authorization logic identifies at step 58 whether the transaction has been approved (Y) or rejected (N). If rejected, then in steps 59 and 60 the authorization logic deletes the transaction from the deferred transaction log 17 and notifies server logic 14 of the rejection. Server logic 14 can then take appropriate action such as notifying the requesting user that transaction authorization has been refused. Operation then proceeds to step 61 where logic 15 decides if there are further transactions awaiting authorization. If not then the process terminates, but if so operation reverts to step 55 to await further authorization. Returning to step 58, if the transaction is authorized here, then in decision 63 the logic 15 determines from the transaction log whether authorization by other users is still required for the transaction. If so, the log is simply updated in step 64 to indicate the current user's authorization, and operation proceeds to step 61 as before. If not, however, the authorization logic will instruct server logic 14 to perform the transaction in step 65. The transaction is then deleted from the deferred transaction log in step 64 and operation proceeds to step 61 for the next transaction requiring authorization. Once all transactions have been authorized (or refused) by the current TAD user, or the time-out limit for authorization is reached, the process is deemed complete.

The foregoing process allows the server to receive transaction authorizations from mobile users whenever they connect via any user computer in the communications system. Only when the necessary authorizations have been received from all required parties, as defined in rule database 18, will a transaction be implemented by the server. The rules in database 18 can implement arbitrary complex multi-party authentication requirements, for instance to reflect organizational responsibilities within companies, the server deciding which transactions must be explicitly authorized by which users. For example, assuming User 1 has initiated a transaction worth 1000 USD, the database might contain a rule specifying that secure transaction authorization is required from User 1 and also from User N if the transaction is worth more than 500 USD. In this case, the server would indicate a pending transaction to the TADs of both users when connected, and only if both users authorize the transaction will it be successfully processed by the server. While MITM or malicious software could attack the transaction initiation process by a user, the subsequent multi-party transaction authentication process is secure against such attacks even though the TADs are operated on untrustworthy computers. Users can trust the information displayed on the TAD and can securely communicate their authorization decisions back to the trusted server of the service provider. Transaction authorization via the TADs thus secures electronic transactions against MITM and malicious software attacks, and supports complex multi-party authorization rules, while maintaining user mobility. In this way, secure multi-party transaction authorization can be efficiently implemented in a mobile computing environment.

While preferred embodiments have been described above, various additions and alternatives can be envisaged. For example, the TAD 5 might also be involved during user authentication when a user of a computer 3 first logs in to the portal of the service provider, e.g. via a web browser, to initiate a transaction. When the user requests access to the portal, the server 2 might return some authentication code, via the secure connection, which can be displayed by the user's TAD just like a pending transaction. The user can then use this code to authenticate with the portal, by entering the code on the keyboard of computer 3 or via the keypad of the TAD. In general in use of TADs, while the user's decision is preferably returned to the server via the secure TLS/SSL channel, the TAD might display some transaction/user specific authorization code generated by the server along with the transaction details. The user could then copy the code from the display and send it to the server via some other, possibly untrustworthy, connection, for instance, via the web browser. This provides for compatibility with existing web portals requiring one-time codes, normally distributed out-of-band via scratch lists or SMS text, to be entered into a web form by the user.

While operation has been described in the context of an online banking service, the system can be applied for authorization of numerous types of server operations, including granting of access to any type of resource. For example, TADs can be used for multi-party access control authorization in the same way as for multi-party transaction authorization. Here, if a user attempts to log in to the portal of the service provider, the server can request approval from one or more persons via their TAD just as for transactions in the earlier example.

TADs could take a variety of forms and may be dedicated solely to purpose or may be integrated with some other device providing limited additional functionality such as a mouse or MP3 player as mentioned earlier. The user interface could be implemented in a variety of ways, and might provide acoustic prompts to users and/or present visual information differently, e.g. utilizing a mouse laser mechanism to produce a projection display on a desktop. The TADs computer and security device interfaces could in general implement any convenient form of wired or wireless connection. Indeed, the security data for establishing the secure connection could be stored in memory physically embedded in the TAD, for example in a secure chip which is physically-protected against tampering, using self-destructing data containers or intrusion detection sensors for instance.

The functionality of server 2 might be distributed over different machines of a server system, and memory 16 may be implemented by one or more different memory components distribute over more than one machine.

It will be appreciated that many other changes and modifications can be made to the exemplary embodiments described without departing from the scope of the invention.

What is claimed is:

1. An apparatus for controlling operations of a server requested from one or more user computers via a data communications network, comprising:
   memory configured to store rule data defining operations requiring authorization by one or more authorizing users; and
   authorization logic adapted to:
   in response to a request from a user computer to perform an operation, to determine from the rule data whether authorization by at least one authorizing user is required for the operation and, if so, to defer the operation;
   communicate with an authorizing device to establish the mutually authenticated connection;
   supply to the authorizing device via the connection information indicative of any deferred operations requested from user computers and requiring authorization by a user of the authorizing device, and to receive authorization from the user; and initiate performance of a deferred operation in response to receipt of authorization from every authorizing user from whom authorization is required for that operation; wherein the authorization device comprises:

a computer interface configured to connect to a local user computer for facilitating communication with the remote server via a data communications network;

a user interface configured to present information to a user; and control logic adapted to:

use security data to establish, via the local user computer, a mutually authenticated connection for encrypted end-to-end communications with the server;

collect from the server, via the connection, information indicative of any operation requested via a different connection to the server and requiring authorization by the user; and present the information to the user via the user interface to prompt for authorization of the operation.

2. The apparatus of claim 1 wherein the authorization logic is adapted to supply the information to the authorizing device in response to a request from the authorizing device via the mutually authenticated connection.

3. The apparatus of claim 1 wherein the authorization logic is adapted to receive the authorization from the user of the authorizing device via the mutually authenticated connection.

4. A server for performing operations requested from one or more user computers via a data communications network, the server comprising:

communications circuitry configured to communicate with the one or more user computers via the data communications network;

server logic configured to perform the operations in response to requests from the one or more user computers; and an apparatus configured to control performance of the operations by the server logic, the apparatus comprising:

memory configured to store rule data defining operations requiring authorization by one or more authorizing users; and authorization logic adapted to:

in response to a request from a user computer to perform an operation, to determine from the rule data whether authorization by at least one authorizing user is required for the operation and, if so, to defer the operation;

communicate with an authorizing device to establish the mutually authenticated connection;

supply to the authorizing device via the connection information indicative of any deferred operations requested from user computers and requiring authorization by a user of the authorizing device, and to receive authorization from the user; and initiate performance of a deferred operation in response to receipt of authorization from every authorizing user from whom authorization is required for that operation; wherein the authorization device comprises:

a computer interface configured to connect to a local user computer for facilitating communication with the remote server via a data communications network;

a user interface configured to present information to a user; and control logic adapted to:

use security data to establish, via the local user computer, a mutually authenticated connection for encrypted end-to-end communications with the server;

collect from the server, via the connection, information indicative of any operation requested via a different connection to the server and requiring authorization by the user; and present the information to the user via the user interface to prompt for authorization of the operation.

5. A data communications system comprising:

a server as claimed in claim 4;

at least one user computer for communicating with the server via a data communications network; and at least one authorization device as configured to connect to the one or more user computers via a computer interface of an authorization device, the authorization device comprising:

a computer interface configured to connect to the one or more local user computers for facilitating communication with the server via the data communications network;

a user interface configured to present information to a user; and control logic adapted to:

use security data accessible to the control logic to establish, via the one or more local user computers, a mutually authenticated connection for encrypted end-to-end communications with the server;

collect from the server, via the connection, information indicative of any operation requested via a different connection to the server and requiring authorization the user; and present the information to the user via the user interface to prompt for authorization of the operation;

wherein the user computer is adapted to relay communications between the authorization device and server via the mutually authenticated connection.

6. A computer program product, comprising:

a non-transitory computer readable storage medium having computer readable instructions stored thereon that, when executed, cause a server, adapted to perform operations requested from user computers via a data communications network and having memory configured to store rule data defining operations requiring authorization by one or more authorizing users, to:

determine from the rule data, in response to a request from a user computer to perform an operation, whether authorization by at least one authorizing user is required for that operation and, if so, to defer that operation;

communicate with an authorizing device to establish the mutually authenticated connection;

supply to the authorizing device via the connection information indicative of any deferred operations requested from user computers and requiring authorization by a user of the authorizing device, and to receive authorization from the user; and perform a deferred operation in response to receipt of authorization from every authorizing user from whom authorization is required for that operation;

wherein the authorization device comprises:
- a computer interface configured to connect to the local user computer for facilitating communication with the remote server via a data communications network;
- a user interface configured to present information to a user; and
- control logic adapted to:
  - use security data to establish, via the local user computer, a mutually authenticated connection for encrypted end-to-end communications with the server;
  - collect from the server, via the connection, information indicative of any operation requested via a different connection to the server and requiring authorization by the user; and
  - present the information to the user via the user interface to prompt for authorization of the operation.

* * * * *